United States Patent
Schumacher (10) Patent No.: US 7,222,049 B2
(45) Date of Patent: May 22, 2007

(54) USER-VIEWABLE RELATIVE DIAGNOSTIC OUTPUT

(75) Inventor: Mark Stephen Schumacher, Minneapolis, MN (US)

(73) Assignee: Rosemount, Inc., Eden Prairie, MN (US)

( * ) Notice: Subject to any disclaimer, the term of this patent is extended or adjusted under 35 U.S.C. 154(b) by 0 days.

(21) Appl. No.: 11/077,805

(22) Filed: Mar. 11, 2005

(65) Prior Publication Data

US 2006/0217928 A1    Sep. 28, 2006

(51) Int. Cl.
*G06F 11/30*    (2006.01)

(52) U.S. Cl. ................. 702/183; 702/185; 702/188

(58) Field of Classification Search ............... 702/183, 702/185, 186, 188; 706/52, 903; 700/28, 700/32, 54
See application file for complete search history.

(56) References Cited

U.S. PATENT DOCUMENTS

| | | | |
|---|---|---|---|
| 5,481,200 A | 1/1996 | Voegele et al. | |
| 5,608,845 A | 3/1997 | Ohtsuka et al. | |
| 5,828,567 A * | 10/1998 | Eryurek et al. | ............... 700/79 |
| 6,017,143 A | 1/2000 | Eryurek et al. | |
| 6,047,220 A | 4/2000 | Eryurek | |
| 6,119,047 A * | 9/2000 | Eryurek et al. | ............... 700/28 |
| 6,473,710 B1 | 10/2002 | Eryurek | |
| 6,539,267 B1 | 3/2003 | Eryurek et al. | |
| 6,556,145 B1 | 4/2003 | Kirkpatrick et al. | |
| 6,615,090 B1 * | 9/2003 | Blevins et al. | ............... 700/26 |
| 6,654,697 B1 | 11/2003 | Eryurek et al. | |
| 6,701,274 B1 | 3/2004 | Eryurek et al. | |
| 6,735,549 B2 | 5/2004 | Ridolfo | |
| 6,760,686 B2 | 7/2004 | Okada | |
| 6,859,755 B2 | 2/2005 | Eryurek et al. | |
| 2004/0045380 A1 | 3/2004 | Nelson et al. | |
| 2004/0128110 A1 | 7/2004 | Schulte et al. | |

OTHER PUBLICATIONS

Article entitled "Unplugging A Pressure Situation" by R. Szanyi, M. Raterman, E. Eryurek; dated Nov. 1, 2003 from the website www.isa.org.

* cited by examiner

*Primary Examiner*—Bryan Bui
(74) *Attorney, Agent, or Firm*—Kinney & Lange, P.A.

(57) ABSTRACT

A transmitter provides a transmitter output representative of a process variable associated with a process. The transmitter receives a sensor signal representative of a process variable from a sensor. The transmitter output based on the sensor signal is provided. The transmitter also provides a user-viewable relative diagnostic output as a function of one or more inputs representative of conditions related to the operation of the transmitter.

39 Claims, 8 Drawing Sheets

USER-VIEWABLE RELATIVE DIAGNOSTIC OUTPUT

BACKGROUND OF THE INVENTION

The present invention relates generally to process control systems. More specifically, the present invention relates to a transmitter for producing a user-viewable diagnostic output representative of the operation of the transmitter.

Field transmitters are used in industrial processes to obtain information associated with the operation of the processes. Sensors located inside the field transmitters, or in communication with the field transmitters, are employed to measure process variables representative of conditions associated with the industrial processes. Examples of process variables include pressure, temperature, flow, density, viscosity, pH, conductivity, product level, turbidity, vibration, position, and any other chemical or physical property associated with the process.

Field transmitters are used, for example, to monitor process variables in chemical, gas, petroleum, and pharmaceutical plants. Typically, the transmitters are mounted on tanks, pipes, or other vessels and may communicate with industrial processes via impulse lines. The transmitters often are configured to transmit a signal representative of a process variable to a control room or other process system. The transmitters may also include a display for communicating a magnitude of the process variable or other information.

As transmitters age, or are subjected to harsh environmental conditions, operation of the transmitters can degrade and transmitter components can malfunction or fail. All electrical components, including the sensors, have the potential to malfunction or fail. In addition, impulse lines can dry out or become obstructed, affecting the accuracy of the process variable measurement.

Transmitter manufacturers have begun to incorporate diagnostic capabilities into transmitters to help assess the operation of the transmitters and facilitate preventative maintenance. Field transmitters have a limited amount of display space and power for communicating increased amounts of diagnostic information to users in a concise and easy to interpret manner. As such, there exists a need for an improved interface for communicating diagnostic information representative of the operation of a field transmitter.

BRIEF SUMMARY OF THE INVENTION

The present invention includes a transmitter for providing a transmitter output representative of a process variable associated with a process. The transmitter includes a sensor input for receiving a sensor signal representative of the process variable and means for providing the transmitter output based upon the sensor signal. The transmitter further includes means for providing a user-viewable relative diagnostic output as a function of one or more inputs representative of conditions related to the operation of the transmitter.

While the above-identified drawing figures set forth several embodiments of the invention, other embodiments are also contemplated, as noted in the discussion. In all cases, this disclosure presents the invention by way of representation and not limitation. It should be understood that numerous other modifications and embodiments can be devised by those skilled in the art that fall within the scope and spirit of the principles of the invention. The figures may not be drawn to scale. Like reference numbers have been used throughout the figures to denote like parts.

DETAILED DESCRIPTION

Figure 1:
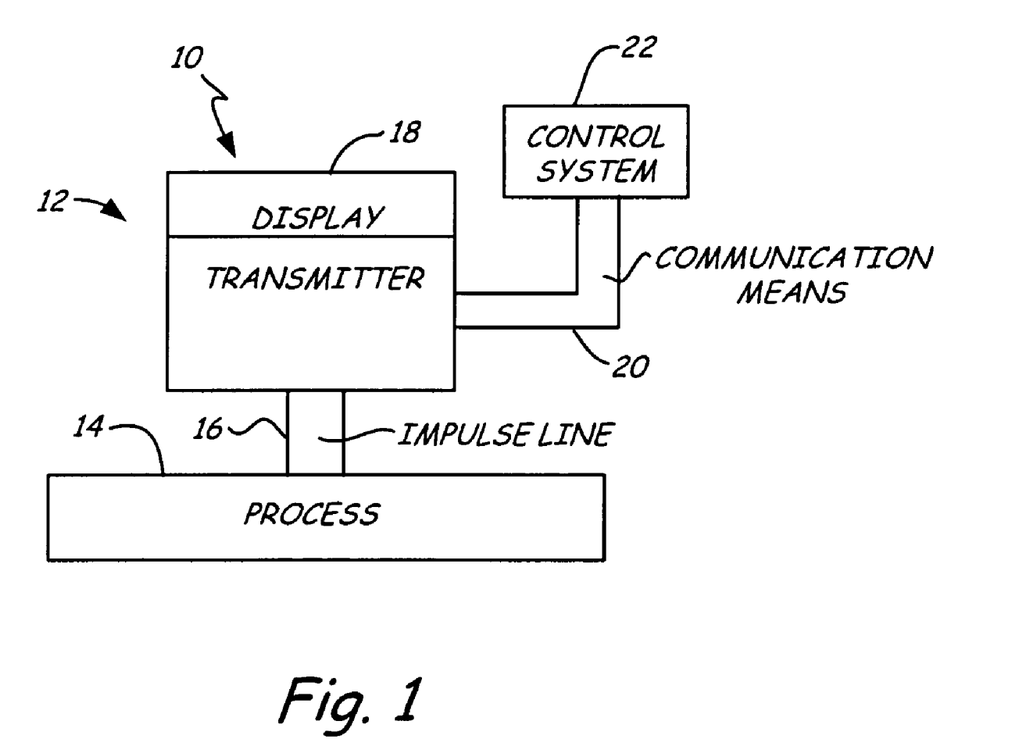
FIG. 1 is a block diagram representation of a transmitter installation including a transmitter with a display.

FIG. 1 shows a block diagram representation of a generic field transmitter installation 10. Installation 10 includes a transmitter 12 of the present invention communicating with an industrial process 14 via an optional impulse line 16. Process 14 contains a process fluid that may be a liquid, a gas, or a mixture of a liquid and a gas. Impulse line 16 places transmitter 12 in fluid communication with process 14.

In the embodiment of FIG. 1, transmitter 12 includes a display (or interface) 18. Communication means 20 connect transmitter 12 to a control system 22, which in some embodiments is a control room or other process control component or system. In one embodiment, communication means 20 is a process control loop such as, for example, a two-wire process control loop or a four-wire process control loop. Examples of suitable process control loop standards include the 4–20 mA standard, the HART communication protocol, the fieldbus communication protocol, the profibus communication protocol, or any other process control loop standard known in the art. In other embodiments, communication means 20 is a wireless communication link or any other communication means known in the art.

Figure 2:
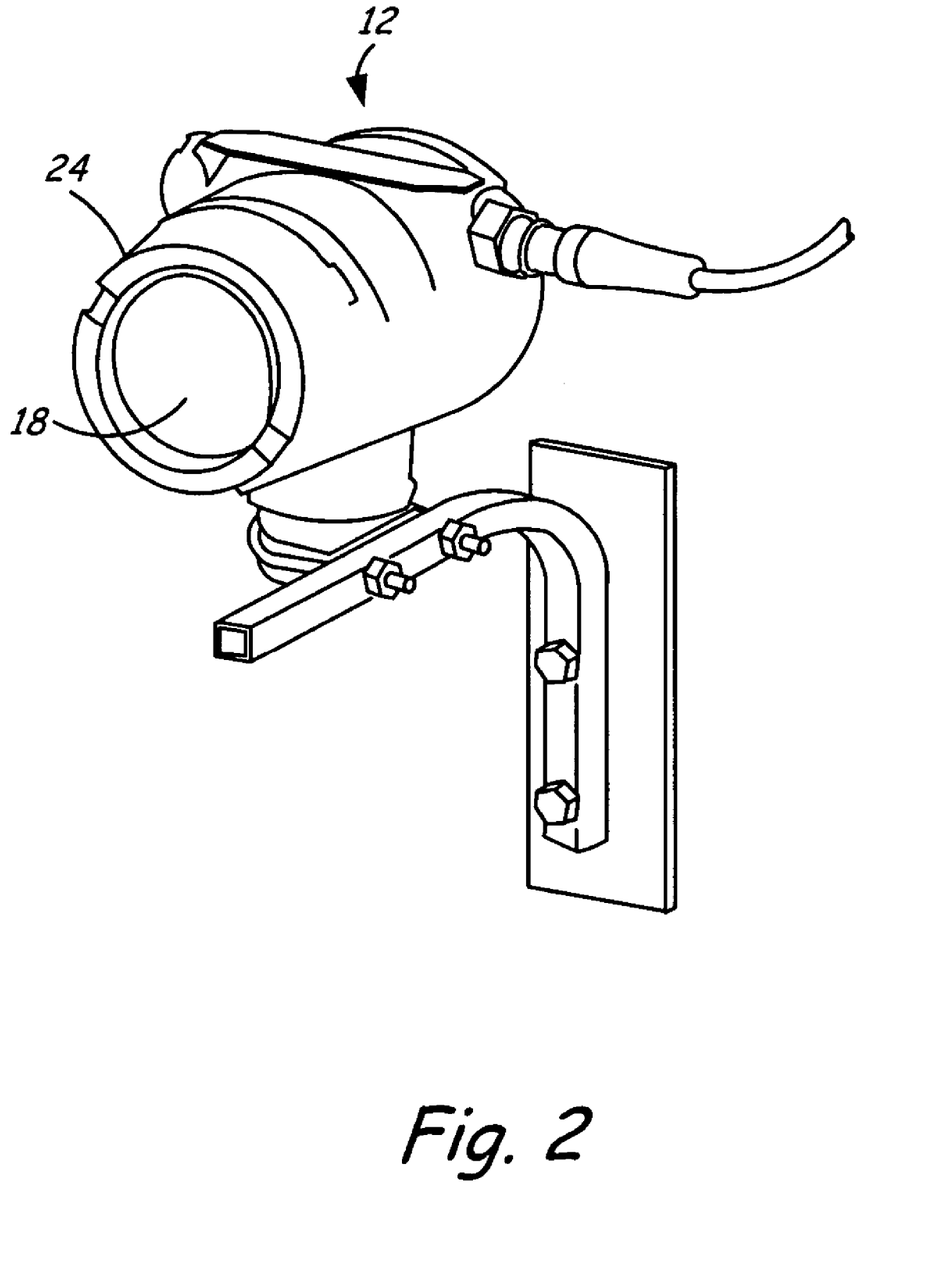
FIG. 2 is a perspective view of an embodiment of the transmitter of FIG. 1 equipped with a display.

FIG. 2 shows a perspective view of an embodiment of transmitter 12 of the present invention. As shown in the embodiment of FIG. 2, transmitter 12 has a housing 24 that includes display 18. In other embodiments, display 18 is positioned at a location spatially separate from transmitter 12 such as, for example, at a location along communication means 20 of FIG. 1 or in a control system 22 of FIG. 1. Examples of suitable displays include liquid crystal displays (LCDs), analog indicators, analog-type needle indicators, light-emitting diodes (LEDs), any other display means known in the art, and any combination of these.

Regardless of the location of display 18, a function of display 18 of the present invention is to communicate a diagnostic output generated by transmitter 12 as a function of inputs representative of conditions related to the operation of transmitter 12. Examples of conditions related to the operation of a transmitter include conditions related to the operation of a single transmitter component, conditions related to the operation of a plurality of transmitter components, conditions related to the operation of the transmitter as a whole, conditions related to the operation of a process in communication with the transmitter, conditions related to the operation of any process control system or component in communication with the transmitter for purposes of supplying power to the transmitter or transmitting information to or from the transmitter, or any combination of these conditions.

Figure 3:
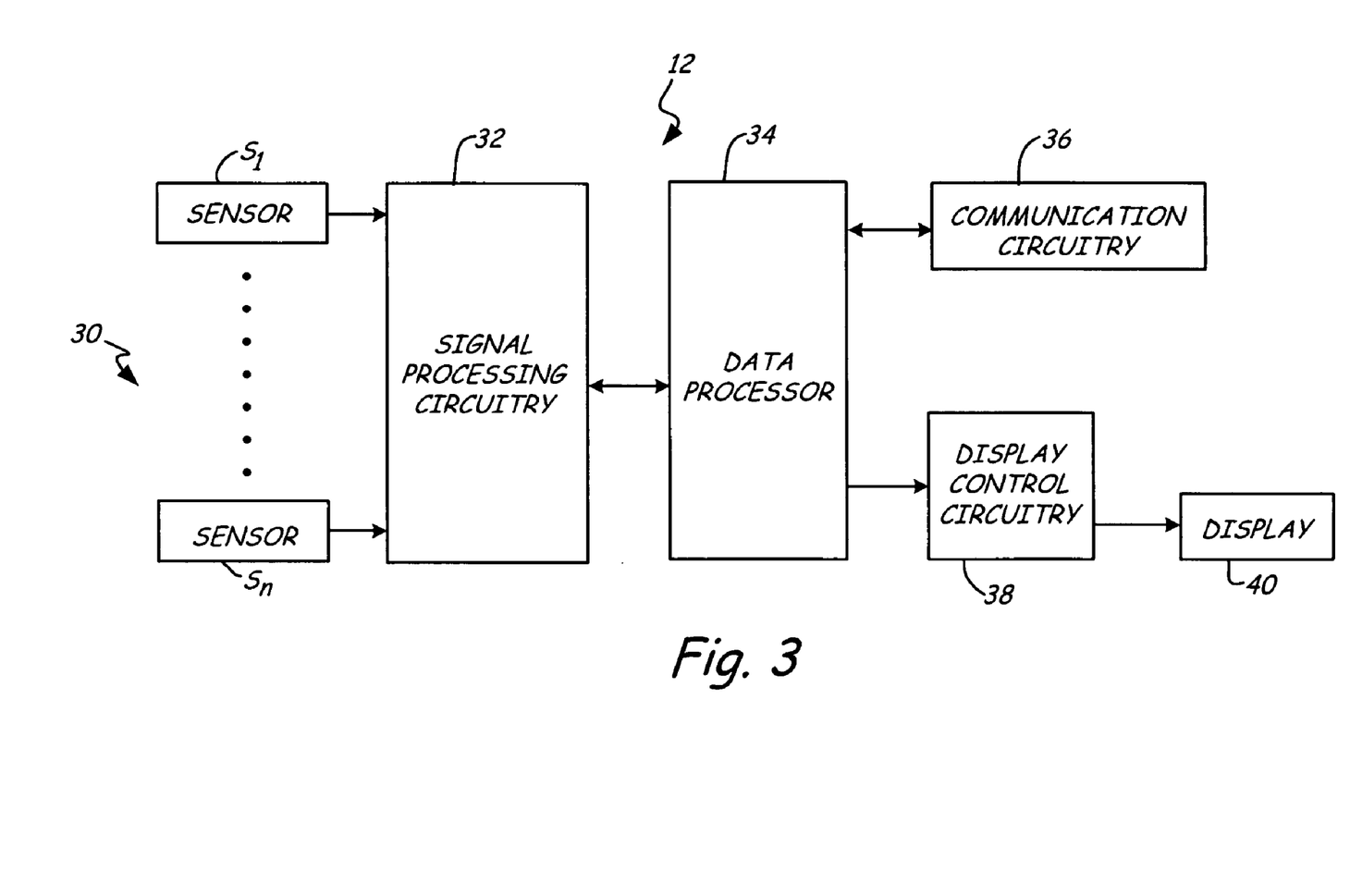
FIG. 3 is a block diagram representation of a transmitter of the present invention for use in the transmitter installation of FIG. 1.

FIG. 3 shows a simplified block diagram illustrating an embodiment of transmitter 12 of FIG. 1. As shown in FIG. 3, transmitter 12 includes a plurality of sensors 30, signal processing circuitry 32, a data processor 34, communication circuitry 36, display control circuitry 38, and a display 40.

Sensors 30 include any number (n) of individual sensors $S_1$ through $S_n$, which are each electrically connected to signal conditioning circuitry 32. In one embodiment, transmitter 12 includes, or is in communication with, only one sensor 30. In some embodiments, some or all of sensors 30 are located outside of transmitter 12. Each sensor 30 produces a sensor signal representative of a sensed parameter, which is conditioned by signal processing circuitry 32 for transmittal to data processor 34.

Data processor 34 monitors the conditioned sensor signals and produces an output as a function of the conditioned sensor signals. The term "data processor," as used herein, includes any circuit or combination of circuits that can perform logic or counting functions to control the operation of transmitter 12 or carry out instructions or necessary steps to produce an output as a function of the conditioned sensor signals. Examples of data processors include microprocessors, application specific integrated circuits (ASICs), programmed gate arrays (PGAs), reduced instruction set computers, and any other suitable computational means known in the art. In an exemplary embodiment, data processor 34 is a microprocessor with associated memory (not shown).

One or more of sensors $S_1$ through $S_n$ are for sensing a process variable associated with process 14. In some embodiments, a plurality of sensors $S_1$ through $S_n$ are for sensing process variables associated with process 14. Examples of process variables include pressure, temperature, flow, density, viscosity, pH, conductivity, product level, turbidity, vibration, position, and any other chemical or physical property associated with process 14. In some embodiments, one or more of sensors $S_1$ through $S_n$ are configured to monitor a parameter or plurality of parameters representative of the operation of impulse line 16, the operation of communication means 20, the operation of transmitter 12, the operation of process 14, and/or the operation of a power supply associated with transmitter 12. In some embodiments, one or more of sensors $S_1$ through $S_n$ are used to correct a process variable or other parameter sensed by a different sensor.

Figure 4:
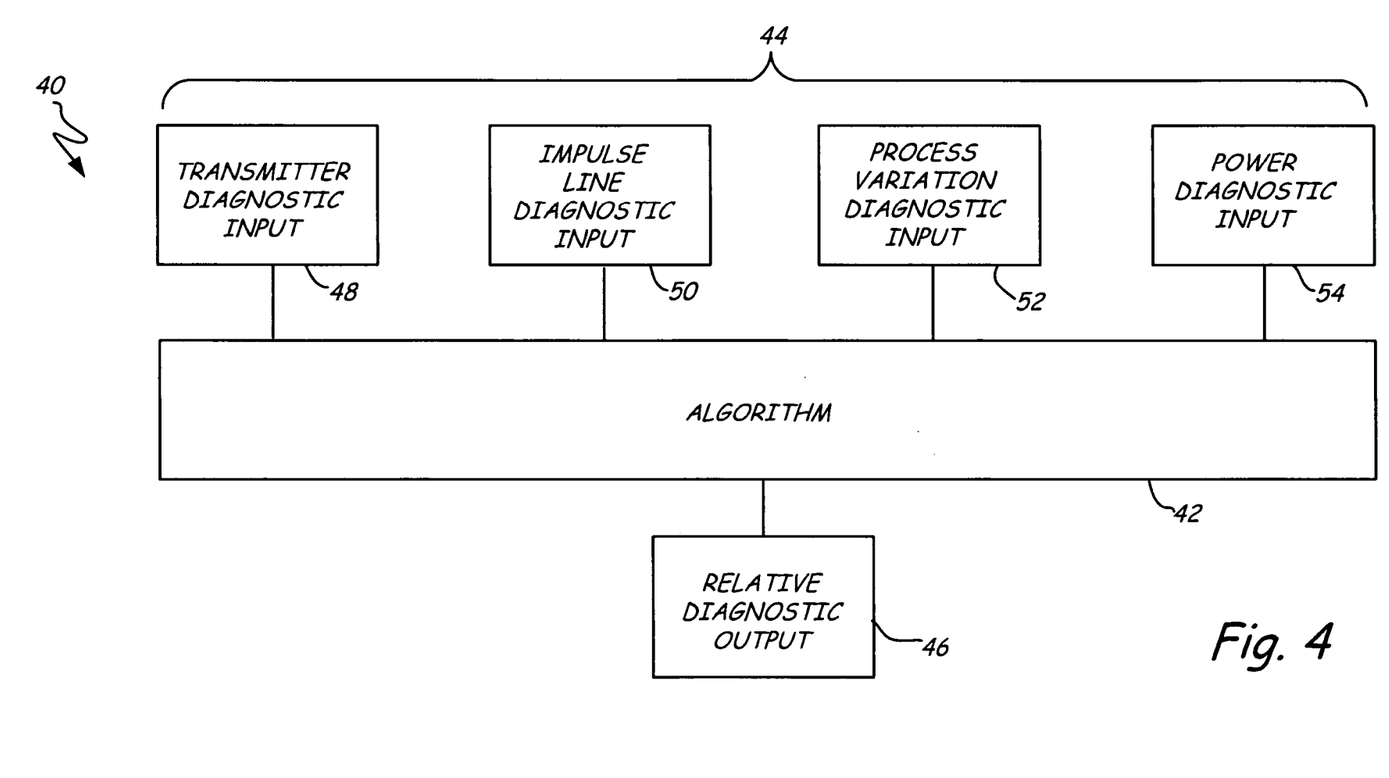
FIG. 4 is a block diagram representation of a method of the present invention for producing a relative diagnostic output representative of the operation of the transmitter installation of FIG. 1.

FIG. 4 is a block diagram representation of a method 40 of the present invention for producing a relative diagnostic output representative of the operation of transmitter 12. An algorithm 42, executed by data processor 34 (FIG. 3) of transmitter 12, monitors one or more diagnostic inputs 44 and generates a relative (or scaled) diagnostic output 46 as a function of diagnostic inputs 44. In some embodiments, algorithm 42 generates a plurality of relative diagnostic outputs 46.

Diagnostic inputs 44 may include any type of input that has affected, or has the potential to affect, the operation of transmitter 12, the operation of a component of transmitter 12, the operation of process 14, or the operation of any component or system communicating with transmitter 12. Diagnostic inputs 44 may include information related to sensor signals generated by sensors 30 of FIG. 3 and/or information derived by data processor 34 of FIG. 3. Examples of diagnostic inputs 44 include transmitter diagnostic inputs, impulse line diagnostic inputs, process variation diagnostic inputs, power diagnostic inputs, any other diagnostic input known in the art that is representative of a condition or plurality of conditions having the potential to affect an operation associated with transmitter 12, and any other diagnostic input known in the art that is representative of a level of operation associated with transmitter 12.

Transmitter diagnostic inputs are representative of a condition or plurality of conditions associated with transmitter 12 that have affected, or have the potential to affect, an operation associated with transmitter 12. Examples of transmitter diagnostic inputs include internal transmitter temperatures, occurrences of over-pressure events, durations of the over-pressure events, transmitter electronics diagnostic information, sensor diagnostic information, and any other inputs related to the operation of transmitter 12. See, for example, U.S. Pat. Nos. 6,701,274, 5,828,567, and 6,473,710.

Impulse line diagnostic inputs are representative of a condition or plurality of conditions associated with the operation of optional impulse line 16. In one embodiment, impulse line diagnostic inputs are representative of a condition (or amount) of plugging, obstruction, and/or drying out of impulse line 16. In other embodiments, the impulse line diagnostic inputs are representative of any other condition, or plurality of conditions, associated with impulse line 16 that has affected, or has the potential to affect, the operation of impulse line 16. See, for example, U.S. Pat. No. 6,654,697.

Process variation diagnostic inputs are representative of the operation of process 14. Examples of process variation inputs include standard deviations for process variables, rates of change for process variables, sample variances for process variables, ranges of sensed process variables, root mean squares for process variables, any statistical indicator for process variation known in the art, and any combination of these. See, for example, U.S. Pat. Nos. 6,017,143, 6,539,267, and 6,047,220.

Power diagnostic inputs are representative of a condition or plurality of conditions that have affected, or have the potential to affect, a power supply associated with transmitter 12. In an embodiment where transmitter 12 is in communication with a process control loop, diagnostic inputs 44 include a power diagnostic input representative of a condition that has affected, or has the potential to affect, communication along the process control loop involving transmitter 12. These conditions may be internal to transmitter 12, external to transmitter 12, or a combination of internal and external conditions relative to transmitter 12. Examples of power diagnostic inputs include transmitter shunt currents, process loop currents, transmitter terminal voltages, and transmitter circuit self-check data. See, for example, U.S. Pat. No. 6,859,755 and 5,481,200.

Diagnostic inputs 44 can be sensor inputs, inputs resulting from the analysis of sensor inputs by data processor 34, or a combination of these. In one embodiment, diagnostic inputs 44 include one or more transmitter diagnostic inputs, one or more impulse line diagnostic inputs, one or more process variation diagnostic inputs, or one or more power diagnostic inputs. In other embodiments, diagnostic inputs 44 include any combination and number of the above types of diagnostic inputs 44, as well as any combination and number of other types of diagnostic inputs known in the art. In still other embodiments, only a single diagnostic input 44 is used.

Examples of relative diagnostic output 46 include a relative indication of the operation of transmitter 12, a relative indication of the operation of process 14, a relative indication of the operation of impulse line 16, a relative indication of the operation of communication means 20, a relative indication of the operation of a power supply associated with transmitter 12, or a relative indication of conditions related to any other operation known in the art capable of affecting the operation of transmitter 12. In some embodiments, relative diagnostic output 46 is an aggregate of two or more of the above relative indications.

In the embodiment of FIG. 4, algorithm 42 automatically generates relative diagnostic output 46 as a function of diagnostic inputs 44. In other embodiments, algorithm 42 generates relative diagnostic output 46 as a function of diagnostic inputs 44 only if it determines diagnostic inputs 44 are representative of a predetermined condition or set of conditions warranting the generation of diagnostic inputs 44.

Examples of algorithm 42 for generating relative diagnostic output 46 include first order equation models, regression models, fuzzy logic systems, neural network models, polynomial curvefits, threshold circuitry, any other combination of instructions or logic steps known in the art, and any combination of these. U.S. Pat. No. 6,701,274, which includes further discussion related to some of these concepts, is incorporated herein by reference.

Figure 5:
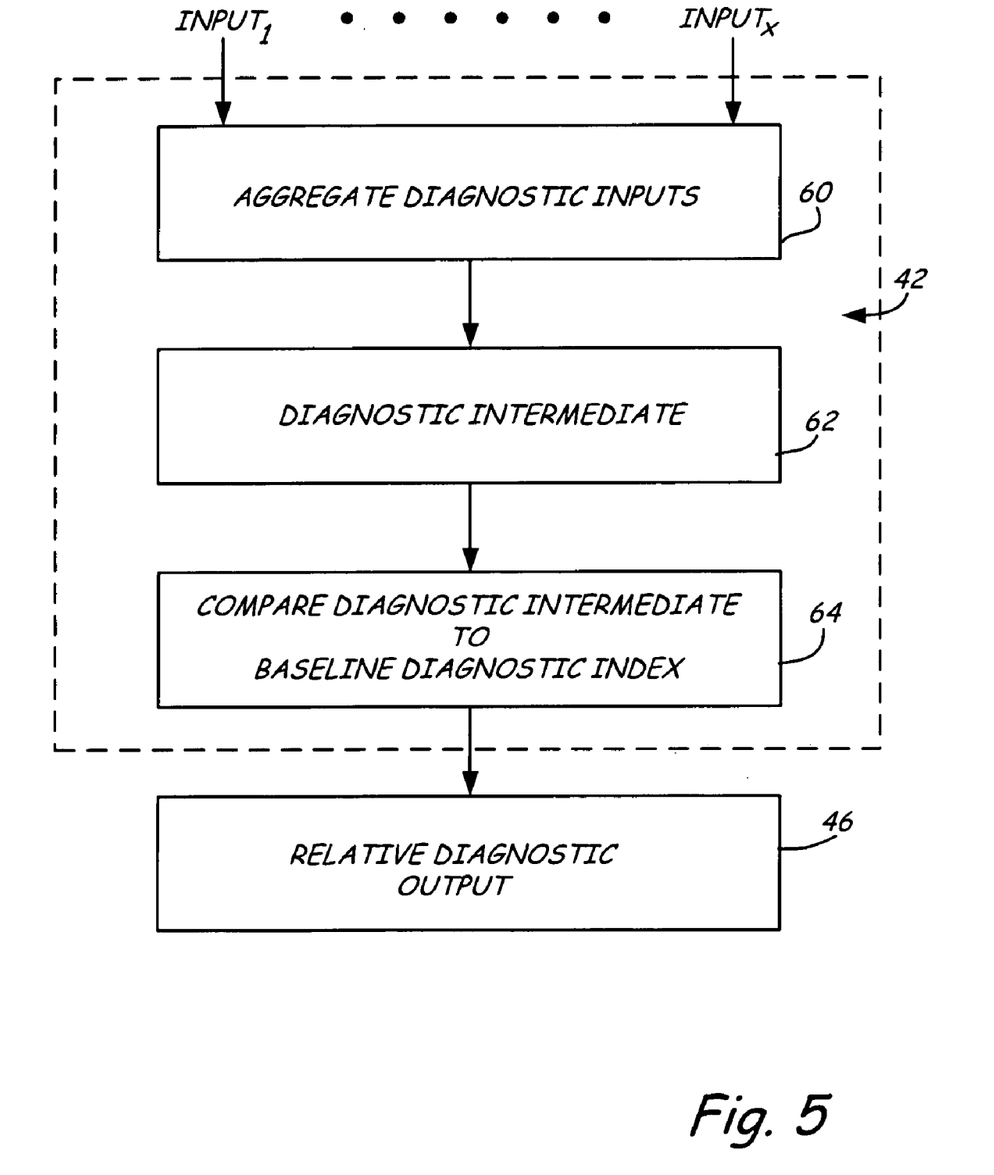
FIG. 5 is a block diagram representation of an algorithm for producing the relative diagnostic output of FIG. 3.

FIG. 5 shows a block diagram representation of an embodiment of algorithm 42 of FIG. 4. As indicated by block 60, algorithm 42 accesses diagnostic inputs 44, which includes any number (x) of $Input_1$ through $Input_x$, and aggregates diagnostic inputs 44 to produce a diagnostic intermediate 62. In some embodiments, each diagnostic input 44 is weighted before producing diagnostic intermediate 62. In some of these embodiments, each diagnostic input 44 is weighted equally relative to other diagnostic inputs, while in other of these embodiments at least some of diagnostic inputs 44 are weighted differently. As indicated by block 66, algorithm 42 then compares diagnostic intermediate 62 to a transmitter baseline diagnostic index to produce relative diagnostic output 46. In one embodiment, the baseline diagnostic index is established through empirical testing such as, for example, high accelerated life testing, and stored in transmitter 12 so that it is accessible to algorithm 42. In some embodiments, the baseline diagnostic index is modified over time by transmitter 12 as transmitter 12 gains runtime in a particular application.

Figure 6:
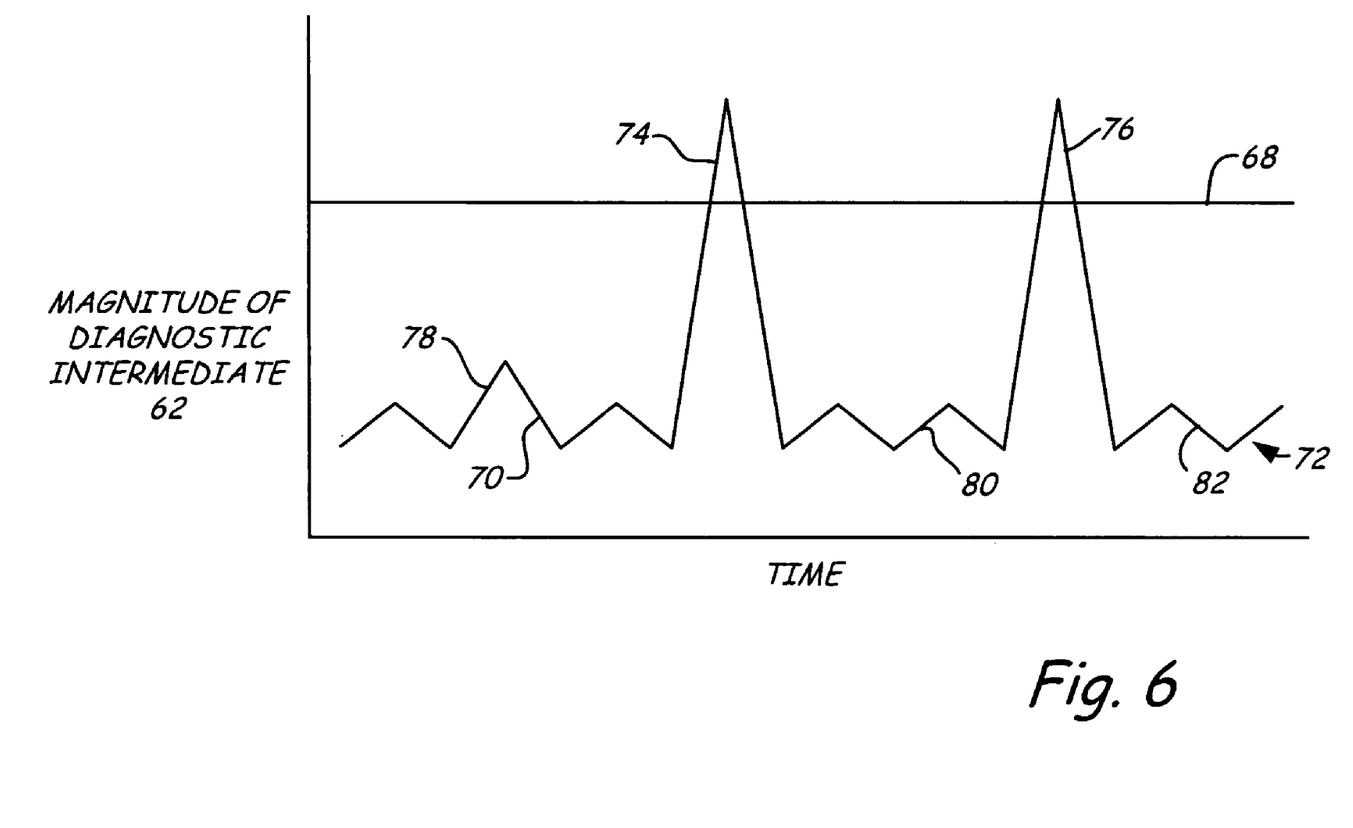
FIG. 6 is a graphical plot of a magnitude of a diagnostic intermediate plotted over time relative to a diagnostic index.

FIG. 6 shows a representative graphical plot of a magnitude of diagnostic intermediate 62 plotted over time relative to a baseline diagnostic index 68. The magnitude of diagnostic intermediate 62 at a particular point in time is represented as a point 70 on plot 72. When the magnitude of diagnostic intermediate 62 exceeds diagnostic index 68, such as along portions 74 and 76 of plot 72, algorithm 42 generates a relative diagnostic output 46 that is representative of a degraded transmitter operation. When the magnitude of diagnostic intermediate 62 is below diagnostic index 68, such as along portions 78, 80, and 82 of plot 72, algorithm 42 generates a relative diagnostic output 46 that is representative of an acceptable or non-degraded transmitter operation.

As discussed above, relative diagnostic output 46 is displayed on a display 18 for viewing by a user. Relative diagnostic output 46 is displayed in relation to a scale (or reference) so the user may efficiently obtain information related to the operation of transmitter 12. A user may then use this information to determine, or anticipate, when repair or preventative maintenance procedures may need to be undertaken. In an exemplary embodiment, relative diagnostic output 46 is displayed in relation to a scale having a first relative limit representative of a degraded level of transmitter operation and a second relative limit representative of an optimal level of transmitter operation.

In some embodiments, a scale is displayed on display 18 along with relative diagnostic output 46. In still other embodiments, relative diagnostic output 46 is displayed on display 18 without an accompanying scale being displayed on display 18. When an accompanying scale is not displayed, that scale is either known, or readily ascertainable, by a user. For example, in one embodiment, relative diagnostic output 46 is displayed as a relative numeric value on a known relative numeric scale such as 1 to 10. In another embodiment, relative diagnostic output 46 is displayed as a relative letter value on a known relative scale such as A through F. In still another embodiment, relative diagnostic output 46 is displayed as a relative percentage on a known relative scale of 0% to 100%.

Figure 7:
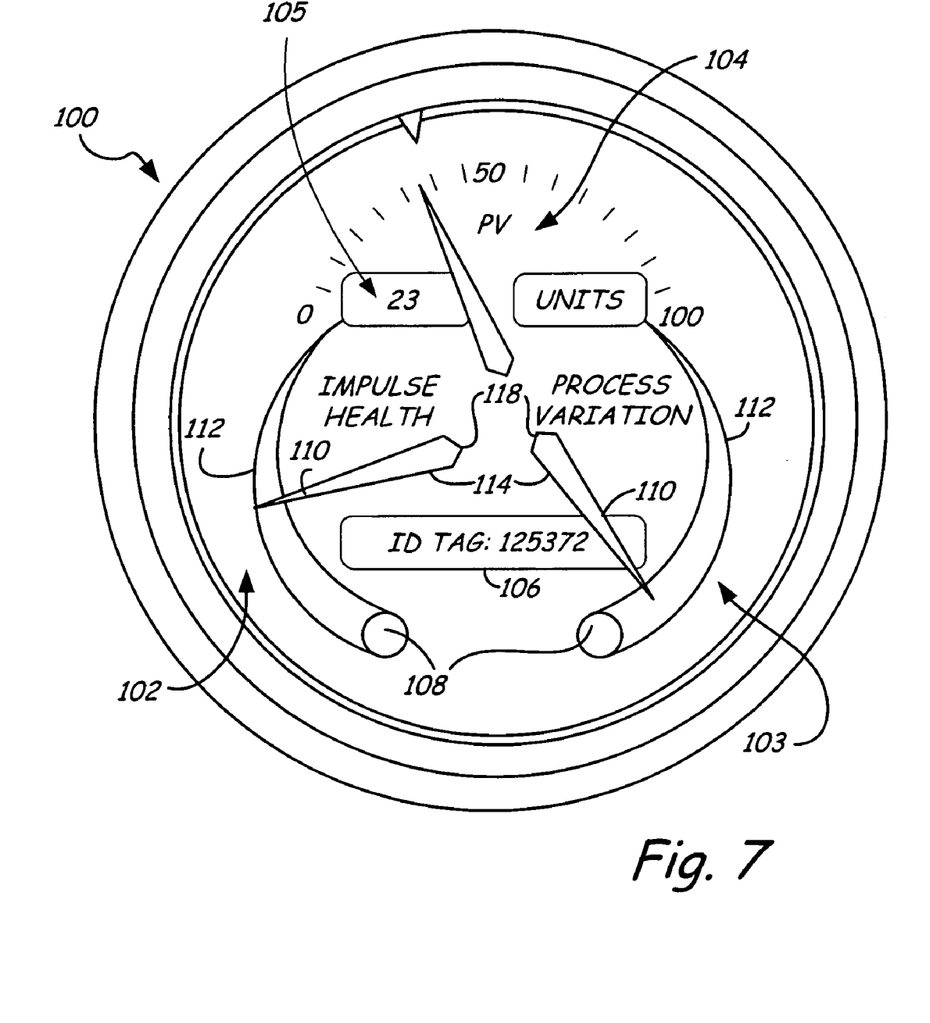
FIG. 7 is a front view of an embodiment of a display of the present invention including a plurality of relative diagnostic indicators.
Figure 8:
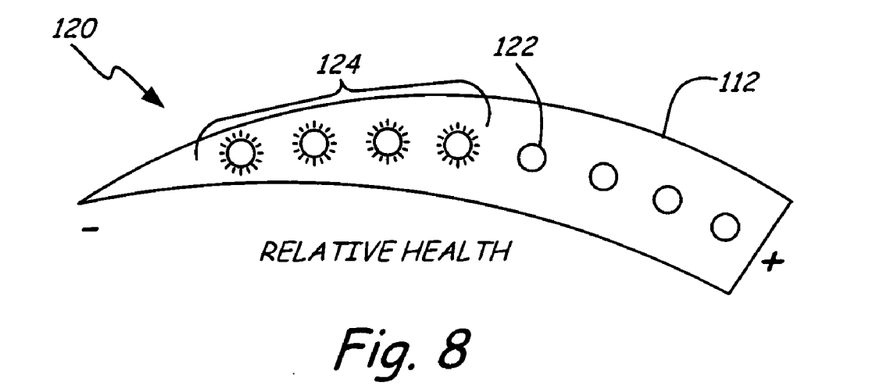
FIG. 8 is a front view of one relative diagnostic indicator of the present invention.
Figure 9:
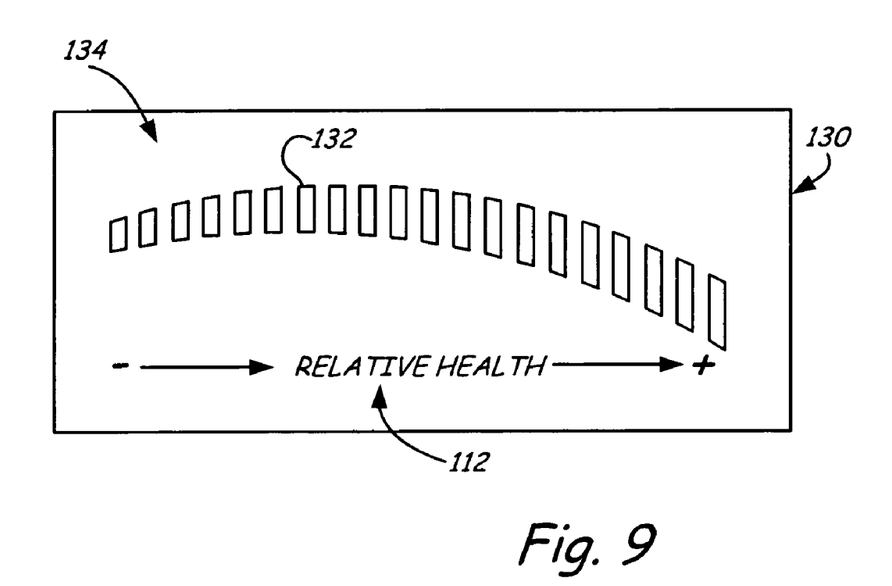
FIG. 9 is a front view of another relative diagnostic indicator of the present invention.

FIGS. 7–9 show different embodiments of the present invention for communicating relative diagnostic output 46, in the context of an accompanying scale, to a user viewing display 18. The embodiments of FIGS. 7–9 communicate relative diagnostic output 46 in the form of a relative health associated with transmitter 12 of FIG. 1. As used herein, the term "relative health" means a relative indication of a present and/or future quality, reliability, or level, of an operation (or operations) associated with transmitter 12.

FIG. 7 shows a display 100 that includes a diagnostic indicator 102, a diagnostic indicator 103, an optional analog process variable indicator 104, an optional LCD process variable indicator 105, an optional transmitter identifier 106, and an optional alarm 108. Diagnostic indicators 102 and 103 each include an indicating element 110 and a scale 112. As shown in the embodiment of FIG. 7, each indicating element 110 is a pointer 114. In other embodiments, each indicating element 110 comprises a graphical member, a plurality of graphical members, an illumination pattern on an array of light-emitting elements, or any other indicating element 110 that moves or varies relative to scale 112 to indicate a change in a relative health.

As shown in FIG. 7, each pointer 114 pivots about an axis 116 to move relative to an accompanying scale 112 as a function of the magnitude of a particular relative diagnostic output 46. The location or configuration of each pointer 114 relative to accompanying scale 112 indicates an associated relative health. In one embodiment of the present invention, pointer(s) 114, scale(s) 112, or both pointer(s) 114 and scale(s) 112 are graphical representations displayed on an LCD or other video display means.

In some embodiments, graduation marks (not shown) are associated with scale 112 to allow the relative health to be viewed with additional precision. In other embodiments, the graduation marks are replaced or supplemented by any other indicia that further describe or indicate the locational relationship of indicating element 110 relative to scale 112.

As shown in FIG. 7, diagnostic indicator 102 indicates a relative health of impulse line 16 and diagnostic indicator 103 indicates a relative health of process 14. In other embodiments, display 18 includes a single diagnostic indicator to indicate a relative health of process 14, a relative health of impulse line 16, a relative health of transmitter 12, a relative health of communication means 20, a relative health of a power supply associated with transmitter 12, or an aggregate relative health of one or more of these. In still other embodiments, display 100 includes a plurality of the above diagnostic indicators in any combination to indicate a plurality of relative healths associated with transmitter 12.

FIG. 8 shows a diagnostic indicator 120 for use with displays of the present invention. Diagnostic indicator 120 has scale 112 that includes a plurality of light-emitting elements 122 arranged in an array. Diagnostic indicator 120 also includes an indicating element in the form of an illumination pattern 124 generated by the selective illumination of light-emitting elements 122. In one embodiment, light-emitting elements 122 are light-emitting diodes.

As shown in FIG. 8, a relative health is communicated by selectively illuminating light-emitting elements 122 as a function of relative diagnostic output 46. For example, in some embodiments, the greater the number of illuminated light-emitting elements 122, the worse the relative health, while in other embodiments, the less the number of illuminated light-emitting elements 122, the better the relative health.

FIG. 9 shows a diagnostic indicator 130 for use with displays of the present invention. Diagnostic indicator 130 includes an indicating element in the form of a plurality of graphical members 132 that are selectively displayed relative to scale 112 to indicate a relative health. Diagnostic indicator 130 is a graphical representation on a video display 134 such as, for example, an LCD or any other type of video display or video monitor known in the art. In one embodiment, diagnostic indicator 130 is displayed on a computer screen in a control room.

Although the present invention has been described with reference to preferred embodiments, workers skilled in the art will recognize that changes may be made in form and detail without departing from the spirit and scope of the invention.

The invention claimed is:

1. A transmitter for providing a transmitter output representative of a process variable associated with a process, the transmitter comprising:
   a sensor input for receiving a sensor signal from a sensor, the sensor signal representative of the process variable;
   means for providing the transmitter output based upon the sensor signal representative of the process variable; and
   means for providing a user-viewable relative diagnostic output as a function of one or more inputs representative of conditions related to operation of the transmitter;
   wherein the relative diagnostic output represents a relative level of operation with respect to a scale comprising a first relative limit and a second relative limit, wherein the first relative limit is representative of a degraded level of operation and the second relative limit is representative of an optimal level of operation.

2. The transmitter of claim 1, wherein the relative diagnostic output is provided as a function of a plurality of inputs representative of conditions related to operation of the transmitter.

3. The transmitter of claim 1, wherein the means for providing a transmitter output comprises a data processor.

4. The transmitter of claim 1, wherein the means for providing the relative diagnostic output comprises a data processor using an algorithm for deriving the relative diagnostic output.

5. The transmitter of claim 4, wherein the algorithm is selected from the group of algorithms consisting of neural networks, fuzzy logic, wavelets, Fourier transforms, and polynomial curve fits.

6. The transmitter of claim 1 further comprising a display for communicating the relative diagnostic output, the display in communication with the means for providing the relative diagnostic output.

7. A transmitter for providing a transmitter output representative of a process variable associated with a process, the transmitter comprising:
   a sensor input for receiving a sensor signal from a sensor, the sensor signal representative of the process variable;
   means for providing the transmitter output based upon the sensor signal representative of the process variable;
   means for providing a user-viewable relative diagnostic output as a function of one or more inputs representative of conditions related to operation of the transmitter;
   a display for communicating the relative diagnostic output, the display in communication with the means for providing the relative diagnostic output wherein the display comprises:
      a scale comprising a first relative limit and a second relative limit, wherein the first relative limit is representative of a degraded level of operation and the second relative limit is representative of an optimal level of operation; and
      a diagnostic indicator for communicating the relative diagnostic output in relation to the first and second relative limits of the scale, wherein the relative diagnostic output represents a relative level of operation.

8. The display of claim 7, wherein the diagnostic indicator comprises an indicating element positionable relative to the scale to indicate the relative diagnostic output.

9. The transmitter of claim 7, wherein the indicating element comprises a pointer.

10. The transmitter of claim 7, wherein the indicating element comprises a graphical member displayed on a liquid crystal display.

11. The transmitter of claim 7, wherein the indicating element comprises an array of light-emitting diodes.

12. The transmitter of claim 7, wherein the scale comprises a user-viewable scale displayed on the display.

13. The transmitter of claim 1 further comprising:
   output circuitry in communication with the means for providing the user-viewable relative diagnostic output, the output circuitry for communicating the diagnostic output to a system in communication with the transmitter.

14. The transmitter of claim 1, wherein the sensor is located in the transmitter.

15. The transmitter of claim 1, wherein the user-viewable relative diagnostic output is a function of an input representative of the operation of an impulse line.

16. The transmitter of claim 1, wherein the user-viewable relative diagnostic output is a function of an input representative of process variation.

17. The transmitter of claim 1, wherein the user-viewable relative diagnostic output is a function of an input representative of the operation of transmitter electronics.

18. The transmitter of claim 1, wherein the user-viewable relative diagnostic output is a function of an input representative of the operation of a process control loop.

19. A transmitter for generating a transmitter output representative of a process variable associated with a process, the transmitter comprising:
   a sensor input for receiving a sensor signal representative of the process variable;

a data processor configured to monitor a plurality of inputs representative of the operation of the transmitter and execute an algorithm to derive a scaled diagnostic output as a function of the plurality of inputs, the data processor in communication with the sensor input, and a display in communication with the data processor to communicate the scaled diagnostic output to a user, the display comprising:

a scale comprising a first relative limit and a second relative limit, wherein the first relative limit is representative of a degraded level of transmitter operation and the second relative limit is representative of an optimal level of transmitter operation; and a diagnostic indicator for communicating the scaled diagnostic output in relation to the first and second relative limits.

20. The transmitter of claim 19, wherein the scaled diagnostic output is a function of an input representative of the operation of an impulse line.

21. The transmitter of claim 19, wherein the scaled diagnostic output is a function of an input representative of process variation.

22. The transmitter of claim 19, wherein the scaled diagnostic output is a function of an input representative of the operation of transmitter electronics.

23. The transmitter of claim 19, wherein the scaled diagnostic output is a function of an input representative of the operation of a process control loop.

24. A method for generating a signal representative of conditions related to the operation of a transmitter that produces a transmitter output representative of a sensed parameter, the method comprising:

providing diagnostic inputs to the transmitter, wherein the diagnostic inputs are based on sensor signals and are representative of conditions related to the operation of the transmitter;

processing the diagnostic inputs to produce a transmitter-derived scaled diagnostic output as a function of the diagnostic inputs;

transmitting the scaled diagnostic output to a user-viewable display; and wherein the scaled diagnostic output is displayed relative to a scale comprising a first relative limit and a second relative limit, wherein the first relative limit is representative of a degraded level of transmitter operation and the second relative limit is representative of an optimal level of transmitter operation.

25. The method of claim 24, wherein one or more of the diagnostic inputs comprises a transmitter-derived diagnostic input based on one or more sensor signals.

26. The method of claim 24 further comprising:
displaying the scaled diagnostic output on a user-viewable display.

27. The transmitter of claim 24, wherein the scaled diagnostic output is a function of a diagnostic input representative of the operation of an impulse line.

28. The transmitter of claim 24, wherein the scaled diagnostic output is a function of a diagnostic input representative of process variation.

29. The transmitter of claim 24, wherein the scaled diagnostic output is a function of a diagnostic input representative of the operation of transmitter electronics.

30. The transmitter of claim 24, wherein the scaled diagnostic output is a function of a diagnostic input representative of the operation of a process control loop.

31. A display for displaying a relative diagnostic output received from a transmitter, the transmitter for producing a transmitter output representative of a process variable associated with an industrial process, the display comprising:

a scale comprising a first relative limit and a second relative limit, wherein the first relative limit is representative of a degraded level of transmitter operation and the second relative limit is representative of an optimal level of transmitter operation; and a diagnostic indicator for communicating the relative diagnostic output in relation to the first and second relative limits of the scale, wherein the relative diagnostic output comprises a transmitter-derived output and represents a relative level of transmitter operation.

32. The display of claim 31 further comprising:
a process variable indicator for indicating a magnitude of the process variable.

33. The display of claim 31, wherein the diagnostic indicator comprises an indicating element positionable relative to the scale to indicate the relative diagnostic output.

34. The display of claim 33, wherein the indicating element comprises a pointer.

35. The display of claim 33, wherein the indicating element comprises a graphical member.

36. The display of claim 35, wherein the display includes a liquid-crystal display for displaying the graphical member.

37. The display of claim 33, wherein the indicating element comprises an anayof light-emitting elements.

38. The display of claim 37, wherein the light-emitting elements comprise light-emitting diodes.

39. The display of claim 31, wherein the scale comprises a user-viewable scale displayed on the display.

* * * * *